United States Patent [19]

Bueno C. et al.

[11] Patent Number: 5,407,460
[45] Date of Patent: Apr. 18, 1995

[54] METHOD FOR IMPROVING QUALITY OF REFORMING GAS USED IN THE DIRECT REDUCTION OF METAL OXIDES

[75] Inventors: Henry R. Bueno C.; Oscar G. Dam G., both of Edo Bolivar; Pedro Torres, Bolivar; Felipe Gutierrez, Edo. Bolivar, all of Venezuela

[73] Assignee: C.V.G. Siderurgica Del Orinoco, C.A., Matanzas, Venezuela

[21] Appl. No.: 209,546

[22] Filed: Mar. 10, 1994

Related U.S. Application Data

[63] Continuation of Ser. No. 846,600, Mar. 5, 1992, abandoned.

[51] Int. Cl.$^6$ .............................................. C21B 13/02
[52] U.S. Cl. ........................................ 75/489; 75/496; 75/497; 75/443; 75/495
[58] Field of Search .................. 423/650, 651; 75/443, 75/444, 446, 450, 458, 489, 495, 496, 497

[56] References Cited

U.S. PATENT DOCUMENTS

| | | | |
|---|---|---|---|
| 4,179,282 | 12/1979 | Rubio | 75/495 |
| 4,528,030 | 7/1985 | Martinez-Vera | 75/496 |
| 4,556,417 | 12/1985 | Martinez-Vera | 75/496 |
| 4,668,284 | 5/1987 | Vera et al. | 75/451 |
| 4,702,766 | 10/1987 | Love et al. | 75/455 |
| 4,756,750 | 7/1988 | Bixler | 75/497 |

*Primary Examiner*—Gary P. Straub
*Attorney, Agent, or Firm*—Bachman & LaPointe

[57] ABSTRACT

A method for modifying existing direct reduction processes and retrofitting existing direct reduction facilities so as to increase the capacity of the facilities without the need for increasing the capacity of external reformers associated with the existing facilities comprises mixing preheated air with the reformed reducing gas produced in the external reformers and containing said mixture with excess natural gas in a reduction-reaction zone of the direct reduction reactor.

2 Claims, 2 Drawing Sheets

METHOD FOR IMPROVING QUALITY OF REFORMING GAS USED IN THE DIRECT REDUCTION OF METAL OXIDES

This is a continuation of application Ser. No. 07/846,600, filed Mar. 5, 1992, now abandoned.

BACKGROUND OF THE INVENTION

It is common in the steel making industry when faced with high cost of scrap as feed material for steel making furnaces to turn to other sources for use as raw material in the steel making process. A particularly attractive raw material is reduced iron which has been produced by the direct reduction of iron oxides. The direct reduced iron oxides (known as DRI) are formed as pellets and/or briquettes and are particularly useful as a feed material to electric arc steel making furnaces.

One of the most common processes employed for the direct reduction of iron oxides resides in the external reformation of natural gas so as to produce a reducing gas for the direct reduction process. Typical processes are disclosed in U.S. Pat. Nos. 3,764,123; 3,816,101; and 4,046,557. In accordance with these processes, a direct reduction reactor is fed with a reducing gas generated in external reformers. The external reformers carry out a catalytic conversion process for converting natural gas and an oxidant to a reducing gas having a high $H_2 + CO$ content. The reducing gas produced in the reformers is thereafter fed to the direct reduction reactor wherein the reformed gas contacts the iron oxide materials at a temperature of about 820° C. so as to reduce the metal oxides to a direct reduced iron product having a metal content of at least 85% Fe. In accordance with the processes, the reduced gases produced in the reformers are cooled down to a temperature of below 850° C. prior to introduction in the reactor. The oxidation degree of the reducing gas produced in the reformers is less than or equal to 0.07 wherein the oxidation degree $\eta_O$ is expressed as follows:

$$\eta_0 = \frac{CO_2 + H_2O}{CO_2 + H_2O + H_2 + CO}$$

It is necessary to cool the reducing gas produced in the reformers prior to feeding same to the reduction reactor so as to control the temperature within the reduction reactor thereby avoiding sticking of the reduced iron in the reduction zone which is detrimental to the efficient operation of the process.

In order to increase the production of existing facilities employing the processes discussed above, one must increase the capacity of the external reformers so as to increase the quantity of reducing gas fed to the reactor. When adding additional external reformers, it is necessary to enlarge existing ducting, etc., of the overall facility. The investment costs and operating costs involved with increasing the capacity of external reformers is significant.

Naturally, it would be highly desirable to provide a method for retrofiting existing direct reduction facilities and modifying existing direct reduction process conditions so as to allow for an increase in the quantity and quality of the reducing gas and correspondingly increase the overall production capacity of existing facilities without the necessity of increasing the existing external reformers.

Accordingly, it is a principal object of the present invention to provide a process for improving the production capacity of conventional direct reduction facilities without the necessity of providing additional external gas reformers.

It is a particular object of the present invention to provide a retrofit direct reduction facility which allows for increased production of direct reduction without requiring increased capacity of external reformers existing within the facility.

It is a further object of the present invention to provide a modified direct reduction process and retrofit direct reduction facility as aforesaid wherein production capacity is increased while at the same time recognizing a reduction in energy consumption of the facility.

Further objects and advantages of the present invention will appear hereinbelow.

SUMMARY OF THE INVENTION

The present invention is drawn to a method for modifying existing direct reduction processes and retrofiting existing direct reduction facilities so as to increase the capacity of the facilities without the need for increasing the capacity of external reformers associated with the existing facilities.

In accordance with the present invention, the process for improving the production capacity of conventional direct reduction facilities comprising a direct reduction reactor and external reformers upstream of the direct reduction reactor for reforming natural gas and oxidants to produce a reducing gas for the direct reduction reactor comprises providing a preheater downstream of the existing external reformer for preheating a source of oxygen to a temperature of between 650°–900° C. The preheated oxygen source is thereafter admixed with the reducing gas produced in the existing external reformers upstream of the direct reduction reactor so as to partially combust the oxygen source in the reducing gas so as to produce a partially oxidized reducing feed gas for the reactor. During the partial combustion of the oxygen source in the reducing gas, the temperature of the feed gas stream to the reactor is raised to a temperature of at least 1100° C. and the oxidation degree ($\eta_0$) is increased to a value of between 0.10 to 0.17 wherein $\eta_0$ is defined as follows:

$$\eta_0 = \frac{CO_2 + H_2O}{CO_2 + H_2O + H_2 + CO}.$$

This partially oxidized reducing gas stream at elevated temperature is thereafter contacted with natural gas within the reduction-reaction zone of the reactor in the presence of the iron oxide material and DRI wherein the DRI acts as a catalyst in an endothermic reaction for further reforming of the natural gas and partially oxidized reducing gas stream so as to increase the quantity and quality of the reducing gas in the reaction zone for reducing the iron oxide ore. In accordance with the present invention, the natural gas admixed with the feed gas in the reactor is present in a ratio equal to $CH_4/\eta_0$ of about 0.5 to 0.7 where $\eta_0$ is defined as follows:

$$\eta_0 = \frac{CO_2 + H_2O}{CO_2 + H_2O + H_2 + CO}.$$

In order to retrofit an existing conventional direct reduction facility so as to carry out the improved process of the present invention, one need only provide a preheater between the existing external reformers and reactor for preheating the oxygen source to be admixed with the reducing gases produced by the external reformer prior to introduction into the reactor. In addition, the facility must be retrofited so as to provide excess natural gas as a feed to the reactor along with the partially oxidized reducing gas. The natural gas may be fed to the reactor either with the partially oxidized reducing gas or, preferably, directly to the reduction-reaction zone of the reactor in a separate feed from the oxidized reducing gas.

By providing a modified process and retrofit facility as aforesaid, the production capacity of existing direct reduction facilities can be Increased by at least 25% without the need for increasing the size of existing external gas reformer. In addition, the cost for the retrofit of the facility is far less than the costs involved for increasing the reducing gas capacity of the existing reformers. Finally, a direct reduction facility retrofitted in a manner in accordance with the present invention recognizes a substantial reduction in energy consumption with reductions of up to 30%.

DETAILED DESCRIPTION

Figure 1:
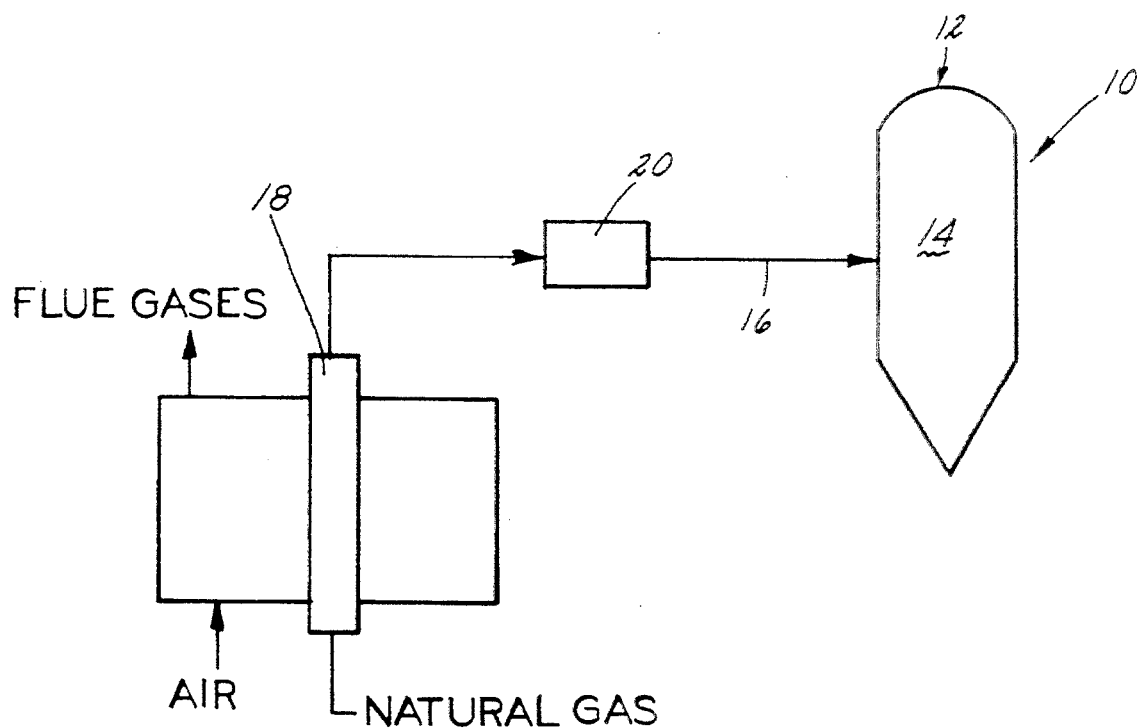
FIG. 1 is a schematic illustration of a conventional direct reduction facility for carrying out the external reformation of reducing gases for use in a vertical shaft direct reduction furnace.

FIG. 1 is an illustration of a conventional direct reduction facility for carrying out the external reformation of reducing gases for use in a vertical shaft direct reduction furnace. With reference to FIG. 1, a reduction reactor 10 is fed through line 12 with an iron oxide feedstock having an iron content of between 60-70% by weight. The reactor 10 is in the form of a vertical shaft type furnace having a reducing zone 14 wherein the metal oxides are contacted with a reducing gas fed to the reducing zone via line 16. In conventional processing technology for the direct reduction of iron oxides, the reducing gases utilized in the reduction practice within the reducing zone are produced externally of the reducing zone by a continuous catalytic reforming process carried out in external reformers 18 wherein a hydrocarbon such as natural gas or any other readily vaporizable hydrocarbon is contacted with an indirectly heated catalyst bed in the presence of an oxidant so as to produce a hot reducing gas which consists principally of CO and $H_2$ wherein the CO and $H_2$ is present in an amount of greater than or equal to 90% by volume. In accordance with known commercial direct reduction processes, the reformed gas exits the reformer at a temperature of about 950° C. The oxidation degree of the reformed gas formed in the reformer can come under ideal situations, be as much as 0.07. Generally, the oxidation degree of the reformed gas is between 0.04 and 0.07. Oxidation degree is defined as:

$$\eta_0 = \frac{CO_2 + H_2O}{CO_2 + H_2O + H_2 + CO}$$

With further reference to FIG. 1, the reformed gas exiting the reformers 18 and having the characteristics set forth above is cooled down in conditioning unit 20 to a temperature of below 850° C. prior to the injection of the reformed gas in the reducing zone 14 of the vertical shaft type reactor furnace 10. It is critical in the known processes described herein to cool the reformed gas to a temperature of 850° maximum so as to ensure that the maximum temperature in the reducing zone is maintained in the range of about between 800° to 830° in order to avoid the agglomeration of the DRI within the reducing zone.

The metalized product obtained in the prior art process described above with reference to FIG. 1 is at least 95% reduced, that is, contains at least 85% Fe.

Heretofore, in order to improve the capacity of the existing direct reduction facility of the type described above with reference to FIG. 1 so as to increase DRI production, it has been necessary to increase the capacity of the external reformers, that is, to increase the amount of reducing gas produced by the external reformers. This could be accomplished only by adding additional catalytic reformers externally of the direct reduction reactor. The cost for adding additional catalytic reformers is extremely high due to the nature of the catalyst bed and the reforming reaction.

Figure 2:
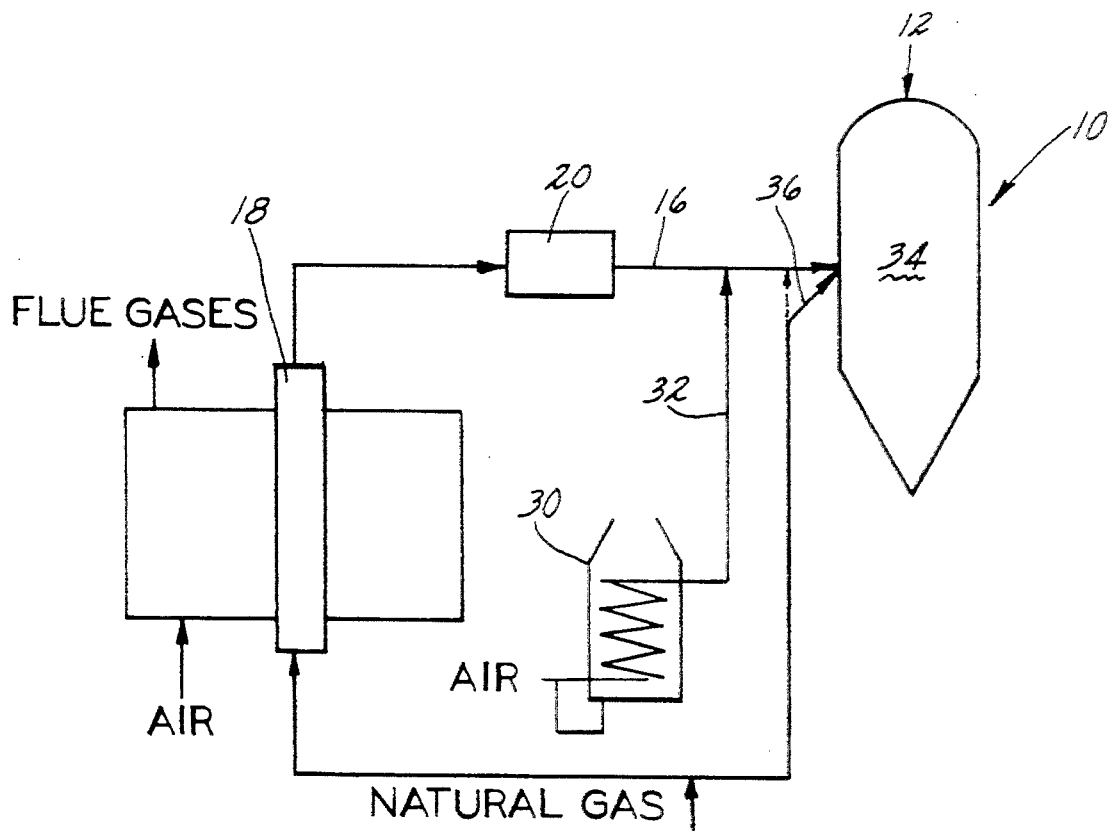
FIG. 2 is a schematic illustration similar to FIG. 1 illustrating the modifications made to an existing direct reduction facility for carrying out a modified process for the direct reduction of iron ore wherein the facility capacity is increased without the need of providing increased capacity external reformers.

With reference to FIG. 2, there is illustrated a modified process and facility for increasing the capacity of existing direct reduction facilities without the need for adding external reformers to the overall facility. With reference to FIG. 2, the existing direct reduction facility and process are modified so as to provide a preheater 30 downstream of the external reformer 18 for preheating a source of oxygen which is fed from the preheater 30 via line 32 into the feed line 16 from the external reformers 18 to the reactor 10 for admixing the preheated oxygen source with the reducing gas exiting the reformers. In accordance with the present invention, the source of oxygen, which may be air or pure oxygen or mixtures thereof, is preheated in the preheater to a temperature of between 650°-900° C., preferably 750°-850° C. The preheated oxygen source is thereafter admixed with the reformed gas exiting the reformer at a temperature of 950° C. If necessary, conditioning unit 20 can be used to heat the reformed gas from the reformer; however, under normal operating conditions no additional heating is required. As the preheated oxygen source is admixed with the reducing gas, partial combustion of the oxygen source takes place. The partial combustion raises the temperature of the partially oxidized reducing feed gas stream to a temperature of at least 1100° C. This temperature increase is controlled by controlling the amount of the oxygen source material preheated and fed to the reducing gas stream. In addition to the rise in temperature, the partially oxidized reducing feed gas stream has a rise in the degree of oxidation over that of the reformed gas produced in reformer 18 such that the degree of oxidation of the partially oxidized reducing feed gas stream is between 0.10 to 0.17.

The partially oxidized reducing feed gas stream as described above is thereafter fed to the reforming-reducing zone 34 of the reactor and contacts the DRI in the presence of natural gas within the reforming-reducing zone. In accordance with the present invention, natural gas is injected, preferably directly into the reforming-reducing zone 34 via line 36, for contacting the partially oxidized reducing feed gas stream within the reforming-reducing zone 34 wherein the DRI in the zone acts as a catalyst for reacting the oxides within the partially oxidized reducing feed gas with the natural gas so as to form in situ additional reducing gas for reaction with the metal oxides being fed to the reforming-reducing zone so as to reduce the metal oxide feed to DRI. As noted above, in accordance with the present invention, it is preferred that the natural gas be fed directly to the reducing zone, however, it should be appreciated that the natural gas could be admixed with the partially oxidized, reducing feed gas stream prior to injection into the reducing zone of the reactor.

In accordance with the present invention, in order to ensure the necessary thermal equilibrium between the partially oxidized reducing feed gas stream, and the metal oxides so as to maintain the reduction process, methane gas is fed to the reformation-reduction zone 34 of the reactor in a ratio with respect to the partially oxidized reducing feed gas stream in an amount sufficient to maintain the ratio of natural gas to the oxidation degree of the feed gas stream that is $CH_4/\eta_0$ of between 0.5 to 0.7 wherein $\eta_0$ is defined as follows:

$$\eta_0 = \frac{CO_2 + H_2O}{CO_2 + H_2O + H_2 + CO}.$$

In Applicant's existing facility which has been modified, see Example below, this represents a natural gas fed to the reformation-reduction zone of equal to about 2 to 4 vol. % with respect to the feed gas stream. By maintaining the ratio of $H_2$ to CO in the feed gas stream at greater than 1.3, providing excess heat from the partially oxidized reducing gas stream, and feeding excess natural gas to the reformation-reducing zone of the reactor in the amount specified, the thermal equilibrium of the process is maintained so as to carry out gas reforming within the reducing zone and maintain the reduction reaction of the metal oxides.

By modifying existing DRI processes and facilities as aforesaid, the production of the facility is increased by greater than 25% without the need of an increase in the capacity of external reformers. In addition, the overall energy consumption is reduced. All this is accomplished at an investment cost which is significantly less than that which would be required in order to obtain a like increase in capacity with the addition of increased, added external reformers.

The advantages of the present invention will be made more clear by the following comparative example.

Figure 4:
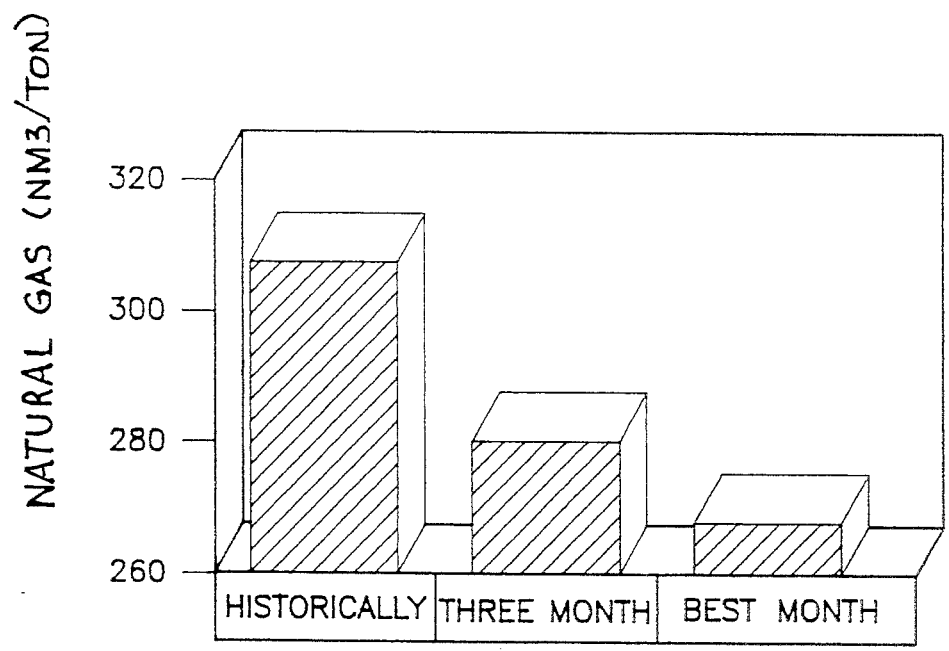
FIG. 4 is a graph illustrating the reduced energy consumption in terms of natural gas obtained in accordance with the present invention.
Figure 3:
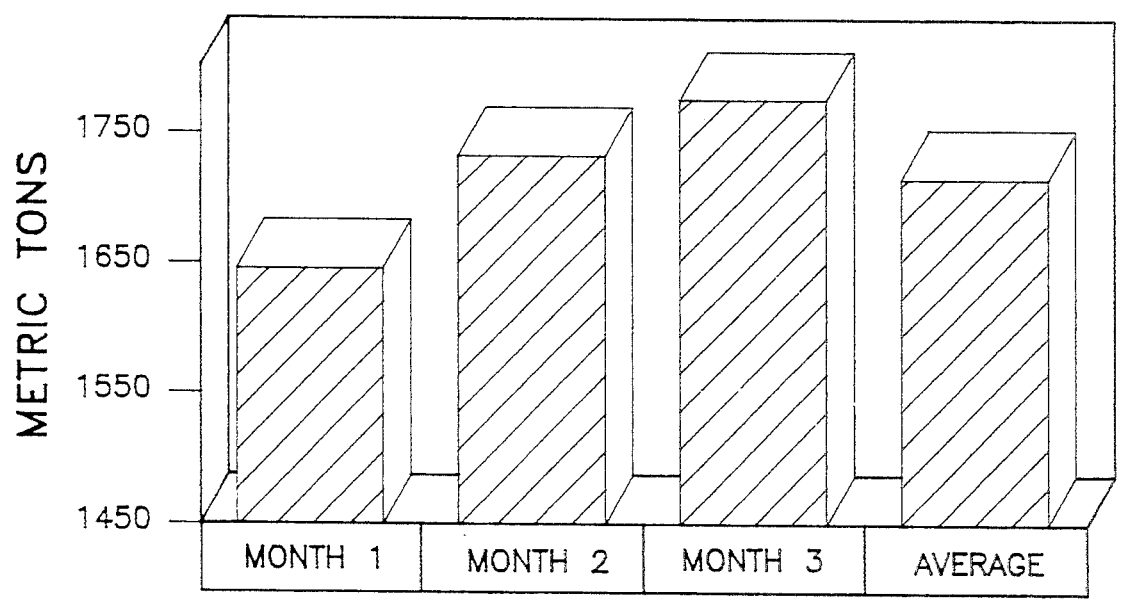
FIG. 3 is a graph illustrating the increased production capacity obtained in accordance with the present invention.

An existing direct reduction facility built in accordance with the prior art described above and in commercial operation at CVG industrial complex at Puerto Ordaz, Venezuela was modified and retrofitted in accordance with the present invention as described above with reference to FIGS. 1 and 2. The modified process in accordance with the present invention lead to an increase production rate on an average for the first three months of operation of about 20 tons of DRI per hour. FIG. 3 graphically illustrates the production of the facility for the first three months of operation. In addition, the energy consumption in terms of natural gas consumption per ton of DRI was substantially reduced as shown in FIG. 4.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency ate intended to be embraced therein.

What is claimed is:

1. A process for improving the production capacity of a conventional direct reduction facility comprising a direct reduction reactor and external reformers upstream of the direct reduction reactor wherein natural gas is fed to the external reformers to produce a producing gas having $H_2$ and CO a temperature of less than 950° C. and a degree of oxidation ($n_0$) of up to 0.07 and wherein the reducing gas so produced is fed to the direct reduction reactor for reducing iron oxide ore to a DRI product characterized by at least 85% metallization, the improvement comprising the steps of: preheating a source of gaseous oxygen to a temperature of about between 650° to 900° C.; admixing said preheating oxygen with said reducing gas downstream of said external reformers and upstream of said reactor so as to produce a partially oxidized, reducing feed gas stream to the reactor having a temperature of at least 1100° C. and a degree of oxidation ($n_0$) of between 0.10 to 0.17; and thereafter contacting said feed gas stream in said reactor with natural gas, iron oxide ore and DRI wherein said DRI acts as a catalyst for reforming said partially oxidized, reducing feed gas stream and natural gas so as to increase the quantity and quality of the reducing gas for reducing the iron oxide ore wherein said natural gas is present in said reactor prior to reformation in a ratio equal to about $$\frac{CH_4}{n_0} = 0.5 \text{ to } 0.7$$

where $n_0$ is the degree of oxidation of said feed gas stream defined as follows:

$$n_0 = \frac{CO_2 + H_2O}{CO_2 + H_2O + H_2 + CO}$$

where $n_0$ is between 0.10 to 0.17.

2. A process according to claim 1 wherein said source of oxygen is selected from the group consisting of pure oxygen, air and mixtures thereof.

* * * * *